United States Patent
Ravikumar et al.

(10) Patent No.: US 12,530,410 B2
(45) Date of Patent: Jan. 20, 2026

(54) SYSTEMS AND METHODS FOR CLUSTERING WITH LIST-DECODABLE COVERS

(71) Applicant: Google LLC, Mountain View, CA (US)

(72) Inventors: Shanmugasundaram Ravikumar, Piedmont, CA (US); Pasin Manurangsi, Mountain View, CA (US); Badih Ghazi, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/434,260

(22) Filed: Feb. 6, 2024

(65) Prior Publication Data

US 2024/0320271 A1   Sep. 26, 2024

Related U.S. Application Data

(63) Continuation of application No. 17/204,546, filed on Mar. 17, 2021, now Pat. No. 11,928,159.

(60) Provisional application No. 63/161,699, filed on Mar. 16, 2021.

(51) Int. Cl.
| | | |
|---|---|---|
| *G06F 16/906* | (2019.01) | |
| *G06F 18/21* | (2023.01) | |
| *G06F 18/214* | (2023.01) | |
| *G06F 18/23213* | (2023.01) | |
| *G06F 18/2413* | (2023.01) | |

(52) U.S. Cl.
CPC .......... *G06F 16/906* (2019.01); *G06F 18/214* (2023.01); *G06F 18/2193* (2023.01); *G06F 18/23213* (2023.01); *G06F 18/24137* (2023.01)

(58) Field of Classification Search
CPC ............ G06F 16/906; G06F 18/23213; G06F 18/2193; G06F 18/214
See application file for complete search history.

(56) References Cited

U.S. PATENT DOCUMENTS

| | | | | |
|---|---|---|---|---|
| 2008/0294617 | A1* | 11/2008 | Chakrabarti | ........ G06F 16/9535 707/999.005 |
| 2010/0082562 | A1* | 4/2010 | Deolalikar | .......... G06F 16/2255 707/E17.005 |
| 2011/0055140 | A1* | 3/2011 | Roychowdhury | .......................... G06F 18/23213 706/54 |
| 2016/0140208 | A1* | 5/2016 | Dang | .................... G06F 16/285 707/737 |

(Continued)

OTHER PUBLICATIONS

Ghazi et al., "Differentially Private Clustering: Tight Approximation Ratios", arxiv.org, Aug. 18, 2020, arXiv:2008.08007v1, 60 pages.

*Primary Examiner* — Apu M Mofiz
*Assistant Examiner* — Farhad Agharahimi
(74) *Attorney, Agent, or Firm* — DORITY & MANNING P.A.

(57) ABSTRACT

Example techniques are provided for the task of differentially private clustering. For several basic clustering problems, including Euclidean DensestBall, 1-Cluster, k-means, and k-median, the present disclosure provides efficient differentially private algorithms that achieve essentially the same approximation ratios as those that can be obtained by any non-private algorithm, while incurring only small additive errors. This improves upon existing efficient algorithms that only achieve some large constant approximation factors.

15 Claims, 5 Drawing Sheets

(56) References Cited

U.S. PATENT DOCUMENTS

| | | | |
|---|---|---|---|
| 2018/0036533 A1 | 2/2018 | Yoo et al. | |
| 2018/0365337 A1* | 12/2018 | Sexton | G06F 16/26 |
| 2019/0034766 A1* | 1/2019 | Chen | G06V 10/82 |
| 2019/0087604 A1* | 3/2019 | Antonatos | G06F 21/6245 |
| 2021/0081822 A1* | 3/2021 | Davidson | G06V 10/945 |

* cited by examiner

SYSTEMS AND METHODS FOR CLUSTERING WITH LIST-DECODABLE COVERS

PRIORITY CLAIM

The present application is based on and claims priority to U.S. Provisional Application 63/161,699 having a filing date of Mar. 16, 2021, which is incorporated by reference herein in its entirety.

FIELD

The present disclosure relates generally to clustering techniques. More particularly, the present disclosure relates to clustering techniques with pure or approximate differential privacy.

BACKGROUND

Techniques for formalizing and guaranteeing strong privacy protections for information such as user information is an ongoing field of research. Differential Privacy (DP) is a rigorous mathematical concept for studying privacy and has been widely adopted in practice. Informally, the notion of privacy is that the algorithm's output (or output distribution) should be mostly unchanged when any one of its inputs is changed. DP is quantified by two parameters $\varepsilon$ and $\delta$; the resulting notion is referred to as pure-DP when $\delta=0$, and approximate-DP when $\delta>0$.

Clustering is a central primitive in unsupervised machine learning. An algorithm for clustering in the DP model informally means that the cluster centers (or the distribution on cluster centers) output by the algorithm should be mostly unchanged when any one of the input points is changed. Many real-world applications involve clustering sensitive data. Motivated by these, a long line of work has studied clustering algorithms in the DP model. However, these previous works typically have unfeasible runtimes and/or fail to achieve the desired level of differential privacy.

SUMMARY

Aspects and advantages of embodiments of the present disclosure will be set forth in part in the following description, or can be learned from the description, or can be learned through practice of the embodiments.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method for performing clustering with improved privacy and computational efficiency. The computer-implemented method includes obtaining, by a computing system may include one or more computing devices, data descriptive of a plurality of input datapoints expressed in a first dimensional space. The method also includes projecting, by the computing system, the plurality of input datapoints into a second dimensional space that has a fewer number of dimensions than the first dimensional space. The method also includes performing, by the computing system within the second dimensional space, a clustering algorithm to identify a plurality of clusters for the input datapoints. Performing the clustering algorithm may include, for each of one or more iterations: defining, by the computing system, a plurality of subsets of neighboring datapoints respectively for the plurality of input datapoints, where the respective subset of neighboring datapoints for each input datapoint includes all input datapoints in a cover within a threshold distance of the input datapoint; and performing, by the computing system, a sparse selection technique on the plurality of subsets of neighboring datapoints to select one of the plurality of clusters. The method also includes determining, by the computing system, a respective cluster center within the first dimensional space for each of the plurality of clusters. Other embodiments of this aspect include corresponding computer systems, apparatus, and computer programs recorded on one or more computer storage devices, each configured to perform the actions of the methods.

Implementations may include one or more of the following features. The computer-implemented method where performing, by the computing system, the sparse selection technique on the plurality of subsets of neighboring datapoints may include probabilistically selecting between: sampling, by the computing system, from a union of all of the plurality of subsets of neighboring datapoints; or sampling, by the computing system, from the cover. Sampling, by the computing system, from the cover may include sampling, by the computing system, approximately uniformly from the cover. The clustering algorithm may be pure differentially private. Performing, by the computing system, the sparse selection technique on the plurality of subsets of neighboring datapoints may include probabilistically selecting between: sampling, by the computing system, from a union of all of the plurality of subsets of neighboring datapoints; or sampling, by the computing system, an additional candidate with a fixed score. The clustering algorithm may be approximately differentially private. The cover may include a lattice-based cover. The threshold distance may include a radius value times one plus an alpha value. Determining, by the computing system, the respective cluster center within the first dimensional space for each of the plurality of clusters may include: performing, by the computing system, a DensestBall algorithm on each respective cluster to find each respective cluster center within the first dimensional space. Determining, by the computing system, the respective cluster center within the first dimensional space for each of the plurality of clusters may include: randomly rotating, by the computing system, the plurality of input datapoints; and for each of a plurality of blocks of the second dimensional space, performing, by the computing system, a DensestBall algorithm. Implementations of the described techniques may include hardware, a method or process, or computer software on a computer-accessible medium.

One general aspect includes a computing system for performing clustering with improved privacy. The computing system also includes one or more processors. The system also includes one or more non-transitory computer-readable media that store instructions that, when executed by the one or more processors, cause the computing system to perform operation. The operations include obtaining data descriptive of a plurality of input datapoints expressed in a first dimensional space. The operations also include projecting the plurality of input datapoints into a second dimensional space that has a fewer number of dimensions than the first dimensional space. The operations also include generating in the second dimensional space a coarse centroid set for the plurality of input datapoints. Generating the coarse centroid set may include, for each of a plurality of iterations: defining, by the computing system, a plurality of subsets of neighboring datapoints respectively for the plurality of input datapoints, where the respective subset of neighboring datapoints for each input datapoint includes all input datapoints in a cover within a threshold distance of the input datapoint; performing, by the computing system, a sparse selection technique on the plurality of subsets of neighboring datapoints to select an additional candidate center; and removing points within a distance of the additional candidate center. The system also includes transforming the coarse centroid set into a coreset. The operations also include performing a clustering algorithm on the coreset to determine the plurality of clusters. The operations also include determining a respective cluster center within the first dimensional space for each of the plurality of clusters. Other embodiments of this aspect include corresponding computer systems, apparatus, and computer programs recorded on one or more computer storage devices, each configured to perform the actions of the methods.

Implementations may include one or more of the following features. The computing system where transforming the coarse centroid set into the coreset may include: constructing an exponential cover around each candidate center to generate a fine centroid set; and snapping each input datapoint to a closest point in the fine centroid set. The clustering algorithm may include a 1-cluster algorithm. The clustering algorithm may include a k-means algorithm. The clustering algorithm may include a k-median algorithm. Implementations of the described techniques may include hardware, a method or process, or computer software on a computer-accessible medium.

One general aspect includes one or more non-transitory computer-readable media that collectively store instructions for performing operations. The operations may include performing a clustering algorithm to identify a plurality of clusters for a plurality of input datapoints, where performing the clustering algorithm may include, for each of one or more iterations: defining, by the computing system, a plurality of subsets of neighboring datapoints respectively for the plurality of input datapoints, where the respective subset of neighboring datapoints for each input datapoint includes all input datapoints in a cover within a threshold distance of the input datapoint; and performing, by the computing system, a sparse selection technique on the plurality of subsets of neighboring datapoints to select one of the plurality of clusters. Other embodiments of this aspect include corresponding computer systems, apparatus, and computer programs recorded on one or more computer storage devices, each configured to perform the actions of the methods.

Implementations may include one or more of the following features. The one or more non-transitory computer-readable media where performing, by the computing system, the sparse selection technique on the plurality of subsets of neighboring datapoints may include probabilistically selecting between: sampling, by the computing system, from a union of all of the plurality of subsets of neighboring datapoints; or sampling, by the computing system, from the cover. Sampling, by the computing system, from the cover may include sampling, by the computing system, approximately uniformly from the cover. Performing, by the computing system, the sparse selection technique on the plurality of subsets of neighboring datapoints may include probabilistically selecting between: sampling, by the computing system, from a union of all of the plurality of subsets of neighboring datapoints; or sampling, by the computing system, an additional candidate with a fixed score. The cover may include a lattice-based cover. Implementations of the described techniques may include hardware, a method or process, or computer software on a computer-accessible medium.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
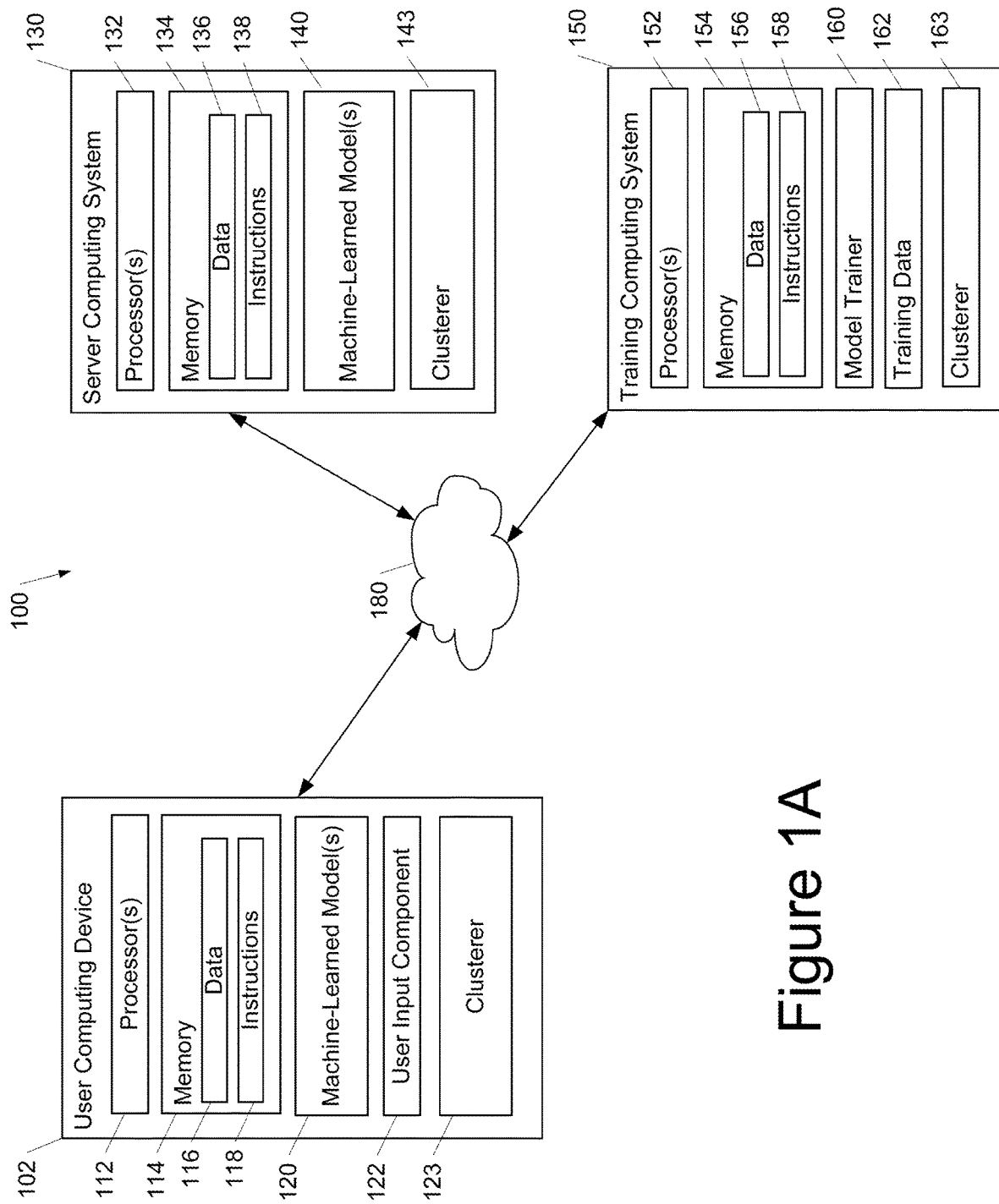
FIG. 1A depicts a block diagram of an example computing system according to example embodiments of the present disclosure.

Reference numerals that are repeated across plural figures are intended to identify the same features in various implementations.

DETAILED DESCRIPTION

Overview

Example techniques are provided for the task of differentially private clustering. In one example, a computing system can obtain data descriptive of a plurality of input datapoints expressed in a first dimensional space. The input datapoints can be any type of data such as machine-learned model parameters (e.g., parameters that have been updated locally), embeddings, feature data, user data, and/or any other form of data. The computing system can project the plurality of input datapoints into a second dimensional space that has a fewer number of dimensions than the first dimensional space and perform a clustering algorithm within the second dimensional space to identify a plurality of clusters for the input datapoints. For example, performing the clustering algorithm can include, for each of one or more iterations: defining a plurality of subsets of neighboring datapoints respectively for the plurality of input datapoints (e.g., the respective subset of neighboring datapoints for each input datapoint can include all input datapoints in a cover within a threshold distance of the input datapoint); and performing a sparse selection technique on the plurality of subsets of neighboring datapoints to select one of the plurality of clusters. As one example, performing the sparse selection technique on the plurality of subsets of neighboring datapoints can include probabilistically selecting between: sampling from a union of all of the plurality of subsets of neighboring datapoints; or sampling, by the computing system, from the cover (e.g., sampling approximately uniformly from the cover). In another example, performing the sparse selection technique on the plurality of subsets of neighboring datapoints can include probabilistically selecting between: sampling, by the computing system, from a union of all of the plurality of subsets of neighboring datapoints; or sampling, by the computing system, an additional candidate with a fixed score. After identifying the plurality of clusters, the computing system can determine a respective cluster center within the first dimensional space for each of the plurality of clusters. The computing system can output the clusters having the determined cluster centers.

The techniques described herein can be used to perform several basic clustering problems, including Euclidean DensestBall, 1-Cluster, k-means, and k-median. Specifically, the present disclosure provides efficient differentially private (e.g., pure or approximate DP) algorithms that achieve essentially the same approximation ratios as those that can be obtained by any non-private algorithm, while incurring only small additive errors. This improves upon existing efficient algorithms that only achieve some large constant approximation factors.

Example results described herein also imply an improved algorithm for the Sample and Aggregate privacy framework. Furthermore, the present disclosure shows that one of the tools used in the proposed 1-Cluster algorithm can be employed to get a faster quantum algorithm for ClosestPair in a moderate number of dimensions.

The systems and methods of the present disclosure provide a number of technical effects and benefits. As one example, the techniques described herein enable clustering with an improved balance between privacy and computational efficiency. Specifically, the present disclosure provides efficient differentially private (e.g., pure or approximate DP) algorithms that achieve essentially the same approximation ratios as those that can be obtained by any non-private algorithm, while incurring only small additive errors. This improves upon existing efficient algorithms that only achieve some large constant approximation factors. As such, the techniques of the present disclosure enable savings of computational resources such as reduced consumption of processor usage, memory space, and/or network bandwidth, while also providing privacy guarantees for increased user privacy.

Example Clustering Formulations

An example input to example clustering problems is a set X of n points, each contained in the d-dimensional unit ball. There are many different formulations of clustering. In the popular k-means problem, the goal is to find k centers minimizing the clustering cost, which is the sum of squared distances from each point to its closest center. The k-median problem is similar to k-means except that the distances are not squared in the definition of the clustering cost. Both problems are NP-hard, and there is a large body of work dedicated to determining the best possible approximation ratios achievable in polynomial time, although the answers remain elusive. Example aspects of the present disclosure consider approximation algorithms for both these problems in the DP model, where a (w, t)-approximation algorithm outputs a cluster whose cost is at most the sum of t and w times the optimum; w can be referred to as the approximation ratio and t as the additive error. It is important that t is small since without this constraint, the problem could become trivial. (Note also that without privacy constraints, approximation algorithms typically work with t=0.)

Example aspects of the present disclosure also provide solutions for two basic clustering primitives, DensestBall and 1-Cluster, in the DP model. These underlie several of the supplied results.

Definition 1 (DensestBall). Given r>0, a (w, t)-approximation for the DensestBall problem is a ball B of radius w·r such that whenever there is a ball of radius r that contains at least T input points, B contains at least T−t input points.

This problem is NP-hard for w=1. Moreover, approximating the largest number of points within any ball of radius of r and up some constant factor is also NP-hard. On the other hand, several polynomial-time approximation algorithms achieving $(1+\alpha, 0)$-approximation for any $\alpha>0$ are known.

DensestBall is a useful primitive since a DP algorithm for it allows one to "peel off" one important cluster at a time. This approach has played a pivotal role in a recent fruitful line of research that obtains DP approximation algorithms for k-means and k-median.

The 1-Cluster problem is the "inverse" of DensestBall, where instead of the radius r, the target number T of points inside the ball is given. Without DP constraints, the computational complexities of these two problems are essentially the same (up to logarithmic factors in the number of points and the input universe size), as one may use binary search on r to convert a DensestBall algorithm into one for 1-Cluster, and vice versa. These two problems are generalizations of the MinimumEnclosingBall (aka MinimumBoundingSphere) problem, which is well-studied in statistics, operations research, and computational geometry.

As is elaborated below, DensestBall and 1-Cluster are also related to other well-studied problems, such as learning halfspaces with a margin and the Sample and Aggregate framework.

Example Results

A common highlight of most of the results given herein for the proposed techniques is that for the problems studied, the proposed algorithms run in polynomial time (in n and d) and obtain tight approximation ratios. Previous work sacrificed one of these, i.e., either ran in polynomial time but produced sub-optimal approximation ratios or took time exponential in d to guarantee tight approximation ratios.

TABLE 1

Comparison of $(\varepsilon, \delta)$-DP algorithms for (w, t)-approximations for DensestBall given r.

| Reference | w | t | Running time |
|---|---|---|---|
| Nissim et al., Locating a small cluster privately. $\delta > 0$ | $O(\sqrt{\log n})$ | $O\left(\frac{\sqrt{d}}{\varepsilon} \cdot \text{poly} \log \frac{1}{\delta}\right)$ | $\text{poly}\left(n, d, \log \frac{1}{r}\right)$ |
| Nissim et al., Clustering algorithms for the centralized and local models. $\delta > 0$ | $O(1)$ | $\tilde{O}_{\varepsilon,\delta}\left(\frac{\sqrt{d}}{\varepsilon} \cdot n^{0.1} \cdot \text{poly} \log \frac{1}{\delta}\right)$ | $\text{poly}\left(n, d, \log \frac{1}{r}\right)$ |

TABLE 1-continued

Comparison of (ε, δ)-DP algorithms for (w, t)-approximations for DensestBall given r.

| Reference | w | t | Running time |
|---|---|---|---|
| McSherry and Talwar, Mechanism design via differential privacy. δ = 0 | $1 + \alpha$ | $O_\alpha\left(\frac{d}{\varepsilon} \cdot \log\frac{1}{r}\right)$ | $O\left(\left(\frac{1}{\alpha r}\right)^d\right)$ |
| Theorem 6 (ours), δ = 0 | $1 + \alpha$ | $O_\alpha\left(\frac{d}{\varepsilon} \cdot \log\left(\frac{d}{r}\right)\right)$ | $(nd)^{O_\alpha(1)} \text{poly} \log\frac{1}{r}$ |
| Theorem 6 (ours), δ > 0 | $1 + \alpha$ | $O_\alpha\left(\frac{\sqrt{d}}{\varepsilon} \cdot \text{poly} \log\left(\frac{nd}{\delta}\right)\right)$ | $(nd)^{O_\alpha(1)} \text{poly} \log\frac{1}{r}$ |

For DensestBall, example techniques described herein obtain for any α>0, a pure-DP $$\left(1 + \alpha, \tilde{O}_\alpha\left(\frac{d}{\varepsilon}\right)\right)$$

-approximation algorithm and an approximate-DP $$\left(1 + \alpha, \tilde{O}_\alpha\left(\frac{\sqrt{d}}{\varepsilon}\right)\right)$$

-approximation algorithm. The notation $\tilde{O}_x(\bullet)$ ignores factors involving x and factors polylogarithmic in n, d, ε, δ. The runtime of the example proposed algorithms is poly(nd). Table 1 shows example results compared to previous work. To solve with DP, example techniques described herein introduce and solve two problems: efficient list-decodable covers and private sparse selection. These could be of independent interest.

For 1-Cluster, example techniques described herein obtain for any α>0, a pure-DP $$\left(1 + \alpha, \tilde{O}_\alpha\left(\frac{d}{\varepsilon}\right)\right)$$

-approximation algorithm running in time $(nd)^{O_\alpha(1)}$. Example techniques described herein also obtain an approximate-DP $$\left(1 + \alpha, \tilde{O}_\alpha\left(\frac{\sqrt{d}}{\varepsilon}\right)\right)$$

-approximation algorithm running in time $(nd)^{O_\alpha(1)}$. The latter is an improvement over previous work that obtained an $$\left(O\left(1 + \frac{1}{\phi}\right), \tilde{O}_{\varepsilon,\delta}(n^\phi \sqrt{d})\right)$$

-approximation. In particular, the previous work does not get an approximation ratio w arbitrarily close to 1. Even worse, the exponent φ in the additive error t can be made close to 0 only at the expense of blowing up w. The proposed algorithm for 1-Cluster follows by applying the proposed DP algorithm for DensestBall, along with "DP binary search".

For k-means and k-median, example techniques described herein are able to take any (not necessarily private) approximation algorithm and convert it to a DP clustering algorithm with essentially the same approximation ratio, and with small additive error and small increase in runtime. More precisely, given any w*-approximation algorithm for k-means (resp., k-median), example techniques described herein can obtain a pure-DP $$\left(w^*(1 + \alpha), \tilde{O}_\alpha\left(\frac{kd + k^{O_\alpha(1)}}{\varepsilon}\right)\right)$$

-approximation algorithm and an approximate-DP $$\left(w^*(1 + \alpha), \tilde{O}_\alpha\left(\frac{k\sqrt{d} + k^{O_\alpha(1)}}{\varepsilon}\right)\right)$$

-approximation algorithm for k-means (resp., k-median). (The current best known non-private approximation algorithms achieve w*=6.358 for k-means and w*=2.633 for k-median.) The proposed algorithms run in time polynomial in n, d and k, and improve on previous work that only obtained some large constant factor approximation ratio independent of w*.

It is known that w* can be made arbitrarily close to 1 for (non-private) k-means and k-median if fixed parameter tractable algorithms are allowed. Recall that an algorithm is said to be fixed parameter tractable in k if its running time is of the form $f(k) \cdot (n)$ for some function $f$, and where n is the input size. Using this, example implementations described herein can provide a pure-DP $$\left(1 + \alpha, \tilde{O}_\alpha\left(\frac{kd + k^2}{\varepsilon}\right)\right)$$

-approximation, and an approximate-DP $$\left(1 + \alpha, \tilde{O}_\alpha\left(\frac{k\sqrt{d} + k^2}{\varepsilon}\right)\right)$$

-approximation. The algorithms run in time $2^{O_\alpha(k \log k)}$poly (nd).

Example Framework

Example DP clustering algorithms described herein follow this three-step recipe:
(i) Dimensionality reduction: randomly project the input points to a low dimension.
(ii) Cluster(s) identification in low dimension: perform a DP clustering algorithm in the low-dimensional space for the problem of interest, which results in cluster(s) of input points.
(iii) Cluster center finding in original dimension: for each cluster found in step (ii), privately compute a center in the original high-dimensional space minimizing the desired cost.

Example Applications

The proposed DP algorithms for 1-Cluster imply better algorithms for the Sample and Aggregate framework. Using a reduction from 1-Cluster, an algorithm can be generated that privately outputs a stable point with a radius not larger than the optimal radius than by a 1+α factor, where α is an arbitrary positive constant.

Moreover, by combining the proposed DP algorithm for DensestBall with a reduction of previous works, the present disclosure provides an efficient DP algorithm for agnostic learning of halfspaces with a constant margin.

Finally, the present disclosure provides an application of one of the observations contained herein outside of DP. In particular, the present disclosure provides a faster (randomized) history-independent data structure for dynamically maintaining in a moderate number of dimensions. This in turn implies a faster quantum algorithm for in a similar setting of parameters.

Example Preliminaries

Example Notation

For a finite universe $\mathcal{U}$ and $\ell \in \mathbb{N}$, we let $\binom{\mathcal{U}}{\leq \ell}$ be the set of all subsets of $\mathcal{U}$ of size at most $\ell$. Let $[n]=\{1, \ldots, n\}$. For $v \in \mathbb{R}^d$ and $r \in \mathbb{R}_{\geq 0}$, let $\mathcal{B}(v, r)$ be the ball of radius r centered at v. For $k \in \mathbb{R}_{\geq 0}$, denote by $\mathbb{B}_k^d$ the quantized d-dimensional unit ball with discretization step k. Whenever we assume that the inputs lie in $\mathbb{B}_k^d$, our results will hold for any discretization as long as the minimum distance between two points as at least k. We throughout consider closed balls.

Differential Privacy (DP)

We next recall the definition and basic properties of DP. Datasets X and X' are said to be neighbors if X' results from removing or adding a single data point from X. This definition of DP is sometimes referred to as removal DP. Some works in the field consider the alternative notion of replacement DP where two datasets are considered neighbors if one results from modifying (instead of removing) a single data point of the other. We remark that (ε, δ)-removal DP implies (2ε, 2δ)-replacement DP. Thus, our results also hold (with the same asymptotic bounds) for the replacement DP notion.

Definition 2 (Differential Privacy (DP)) Let $\varepsilon, \delta \in \mathbb{R}_{\geq 0}$ and $n \in \mathbb{N}$. A randomized algorithm $\mathcal{A}$ taking as input a dataset is said to be (ε, δ)-differentially private if for any two neighboring datasets X and X', and for any subset S of outputs of $\mathcal{A}$, it holds that $\Pr[\mathcal{A}(X) \in S] \leq e^\varepsilon \cdot \Pr[\mathcal{A}(X') \in S] + \delta$. If δ=0, then $\mathcal{A}$ is said to be ε-differentially private.

We assume throughout that $0 < \varepsilon \leq O(1)$, $0 < \alpha < 1$, and when used, δ>0. These can be inputs to the algorithms.

Example Clustering

Since many of the proof components are common to the analyses of k-means and k-media, we will use the following notation, which generalizes both problems.

Definition 3 ((k, p)-Clustering) Given $k \in \mathbb{N}$ and a multi-set $X=\{x_1, \ldots, x_n\}$ of points in the unit ball, we wish to find k centers $c_1, \ldots, c_k \in \mathbb{R}^d$ minimizing $\text{cost}_X^P(c_1, \ldots, c_k) := \Sigma_{i \in [n]} (\min_{j \in [k]} \|x_i - c_j\|)^p$. Let $\text{OPT}_X^{p,k}$ denote $\min_{c_1, \ldots, c_k \in \mathbb{R}^d} \text{cost}_X^P(c_1, \ldots, c_k)$. The cost is sometimes defined as the (1/p)th power. A (w, t)-approximation algorithm for (k, p)-Clustering outputs $c_1, \ldots, c_k$ such that $\text{cost}_X^P(c_1, \ldots, c_k) \leq w \cdot \text{OPT}_X^{p,k} + t$. When X, p, and k are unambiguous, we drop the subscripts and superscripts.

Note that (k, 1)-Clustering and (k, 2)-Clustering correspond to k-median and k-means respectively. It will also be useful to consider the Discrete (k, p)-Clustering problem, which is the same as in Definition 3, except that we are given a set $\mathcal{C}$ of "candidate centers" and we can only choose the centers from $\mathcal{C}$. We use $\text{OPT}_X^{p,k}(\mathcal{C})$ to denote $\min_{c_{i_1}, \ldots, c_{i_k} \in \mathcal{C}} \text{cost}_X^P(c_{i_1}, \ldots, c_{i_k})$.

Centroid Sets and Coresets

A centroid set is a set of candidate centers such that the optimum does not increase by much even when we restrict the centers to belong to this set.

Definition 4 (Centroid Set) For $w, t > 0$, $p \geq 1$, $k, d \in \mathbb{N}$, a set $\mathcal{C} \subseteq \mathbb{R}^d$ is a (p, k, w, t)-centroid set of $X \subseteq \mathbb{R}^d$ if $\text{OPT}_X^{p,k}(\mathcal{C}) \leq w \cdot \text{OPT}_X^{p,k} + t$. When k and p are unambiguous, we simply say that $\mathcal{C}$ is a (w, t)-centroid set of X.

A coreset is a (multi)set of points such that, for any possible k centers, the cost of (k, p)-Clustering of the original set is roughly the same as that of the coreset.

Definition 5 (Coreset) For $\gamma, t > 0$, $p \geq 1$, $k \in \mathbb{N}$, a set X' is a (p, k, γ, t)-coreset of $X \subseteq \mathbb{R}^d$ if for every $\mathcal{C} = \{c_1, \ldots, c_k\} \subseteq \mathbb{R}^d$, we have $(1-\gamma) \cdot \text{cost}_X^P(\mathcal{C}) - t \leq \text{cost}_{X'}(\mathcal{C}) \leq (1+\gamma) \cdot \text{cost}_X^P(\mathcal{C}) + t$. When k and p are unambiguous, we simply say that X' is a (γ, t)-coreset of X.

Example Private DensestBall

In this section, we obtain pure-DP and approximate-DP algorithms for DensestBall.

Theorem 6. There is an ε-DP (resp., (ε, δ)-DP) algorithm that runs in time $(nd)^{O_\alpha(1)} \cdot \text{poly} \log(1/r)$ and, with probability 0.99, returns a $$\left(1+\alpha, O_\alpha\left(\frac{d}{\varepsilon} \cdot \log\left(\frac{d}{r}\right)\right)\right)$$

-approximation (resp., $$\left(1+\alpha, O_\alpha\left(\frac{\sqrt{d}}{\varepsilon} \cdot \text{poly} \log\left(\frac{nd}{\delta}\right)\right)\right)$$

-approximation) for DensestBall.

To prove this, we follow the three-step recipe outlined above. Using the Johnson-Lindenstrauss (JL) lemma (William B. Johnson and Joram Lindenstrauss. Extensions of lipschitz mappings into hilbert space. *Contemporary mathematics*, 26:189-206, 1984.) together with the Kirszbraun Theorem (Mojzesz Kirszbraun. Über die zusammenziehende und lipschitzsche transformationen. *Fundamenta Mathematicae*, 22(1):77-108, 1934.), we project the input to $O((\log n)/\alpha^2)$ dimensions in step (i). It turns out that step (iii) is similar to (ii), as we can repeatedly apply a low-dimensional DensestBall algorithm to find a center in the high-dimensional space. Therefore, the bulk of our technical work is in carrying out step (ii), i.e., finding an efficient, DP algorithm for DensestBall in $O((\log n)/\alpha^2)$ dimensions. We focus on this part in the rest of this section.

A Private Algorithm in Low Dimensions

Having reduced the dimension to $d'=O((\log n)/\alpha^2)$ in step (i), we can afford an algorithm that runs in time $\exp(O_\alpha(d'))=n^{O_\alpha(1)}$. With this in mind, our algorithms in dimension d' have the following guarantees:

Theorem 7. There is an ε-DP (resp., (ε, δ)-DP) algorithm that runs in time $(1+1/\alpha)^{O(d')}$poly $\log(1/r)$ and, w.p. 0.99, returns a $$\left(1+\alpha, O_\alpha\left(\frac{d'}{\varepsilon}\log\left(\frac{1}{r}\right)\right)\right)$$

-approximation (resp., $$\left(1+\alpha, O_\alpha\left(\frac{d'}{\varepsilon}\log\left(\frac{n}{\varepsilon\delta}\right)\right)\right)$$

-approximation) for DensestBall.

As the algorithms are allowed to run in time exponential in d', Theorem 7 might seem easy to devise at first glance. Unfortunately, even the Exponential Mechanism, which is the only known algorithm achieving approximation ratio arbitrarily close to 1, still takes $\Theta_\alpha(1/r)^{d'}$ time, which is $\exp(\omega(d'))$ for $r=o(1)$. (In fact, in applications to k-means and k-median, we set r to be as small as $1/n$, which would result in a running time of $n^{\Omega(\log n)}$.) To understand, and eventually overcome this barrier, we recall the implementation of the Exponential Mechanism for DensestBall:

Consider any $(\alpha r)$-cover C of the unit ball $(0,1)$. A $\zeta$-cover C of $(0,1)$ is a set of points such that for any $y \in (0,1)$, there is $c \in C$ with $\|c-y\| \leq \zeta$.

For every $c \in C$, let score[c] be the number of input points lying inside $\mathcal{B}(c, (1+\alpha)r)$.

Output a point $c^* \in C$ with probability $$\frac{e^{(\varepsilon/2)\cdot score[c^*]}}{\sum_{c \in C} e^{(\varepsilon/2)\cdot score[c]}}.$$

By the generic analysis of the Exponential Mechanism, this algorithm is ε-DP and achieves a $$\left(1+\alpha, O_\alpha\left(\frac{d'}{\varepsilon}\log\left(\frac{1}{r}\right)\right)\right)$$

-approximation as in Theorem 7. The existence of an $(\alpha r)$-cover of size $$\Theta\left(\frac{1}{\alpha r}\right)^{d'}$$

is well-known and directly implies the $\Theta_\alpha(1/r)^{d'}$ running time stated above.

One primary technical contribution of the present disclosure is to implement the Exponential Mechanism in $\Theta_\alpha(1)^{d'}$ poly log $1/r$ time instead of $\Theta_\alpha(1/r)^{d'}$. To elaborate on our approach, for each input point $x_i$, we define $S_i$ to be $C \cap \mathcal{B}(x_i, (1+\alpha)r)$, i.e., the set of all points in the cover C within distance $(1+\alpha)r$ of $x_i$. Note that the score assigned by the Exponential Mechanism is score[c]=$\{i \in [n] | c \in S_i\}$, and our goal is to privately select $c^* \in C$ with as large a score as possible. Two main questions remain: (1) How do we find the $S_i$'s efficiently? (2) Given the $S_i$'s, how do we sample $c^*$? We address these in the following two subsections, respectively.

Efficiently List-Decodable Covers

In this section, we discuss how to find $S_i$ in time $(1+1/\alpha)^{O(d')}$. Specifically, we introduce the notion of list-decodability for covers:

Definition 8 (List-Decodable Cover) A $\Delta$-cover is list-decodable at distance $\Delta' \geq \Delta$ with list size $\ell$ if for any $x \in \mathcal{B}(0,1)$, we have that $|\{c \in C | \|c-x\| \leq \Delta'\}| \leq \ell$. Moreover, the cover is efficiently list-decodable if there is an algorithm that returns such a list in time $(\ell, d', \log(1/\Delta))$.

We prove the existence of efficiently list-decodable covers with the following parameters:

Lemma 9 For every $0 < \Delta < 1$, there exists a $\Delta$-cover $C_\Delta$ that is efficiently list-decodable at any distance $\Delta' \geq \Delta$ with list size $(1+\Delta'/\Delta)^{O(d')}$.

In this terminology, $S_i$ is exactly the decoded list at distance $\Delta'=(1+\alpha)r$, where $\Delta=\alpha r$ in our cover C. As a result, we obtain the $(1+1/\alpha)^{O(r)}$ bound on the time for computing $S_i$, as desired.

The proof of Lemma 9 includes two tasks: (i) bounding the size of the list and (ii) coming up with an efficient decoding algorithm. It turns out that (i) is not too hard: if our cover is also an $\Omega(\Delta)$-packing, then a standard volume argument implies the bound in Lemma 9. A $\zeta$-packing is a set of points such that each pairwise distance is at least $\zeta$.

However, carrying out (ii) is more challenging. To do so, we turn to lattice-based covers. A lattice is a set of points that can be written as an integer combination of some given basis vectors. Rogers (Claude A Rogers. Lattice coverings of space. *Mathematika*, 6(1):33-39, 1959.) constructed a family of lattices that are both $\Delta$-covers and $\Omega(\Delta)$-packings. Furthermore, known lattice algorithms for the so-called Closest Vector Problem allow us to find a point $c \in C_\Delta$ that is closest to a given point x in time $2^{O(d')}$. With some more work, we can "expand" from c to get the entire list in time polynomial in $\ell$. This concludes the outline of our proof of Lemma 9.

SparseSelection

We now move to (2): given $S_i$'s, how to privately select $c^*$ with large score[$c^*$]=$|\{i | c^* \in S_i\}|$?

We formalize the problem as follows:

Definition 10 (SparseSelection) For $\ell \in \mathbb{N}$, the input to the $\ell$-SparseSelection problem is a list $S_1, \ldots, S_n$ of subsets, where $S_1, \ldots, S_n \in \binom{C}{\leq \ell}$ for some finite universe C. An algorithm solves $\ell$-SparseSelection with additive error t if it outputs a universe element $\hat{c} \in C$ such that $|\{i | \hat{c} \in S_i\}| \geq \max_{c \in C} |\{i | c \in S_i\}| - t$.

The crux of our SparseSelection algorithm is the following. Since score[$c^*$]=0 for all $c^* \notin S_1 \cup \ldots \cup S_n$, to implement the Exponential Mechanism it suffices to first randomly select (with appropriate probability) whether we should sample from $S_1 \cup \ldots \cup S_n$ or uniformly from C. For the former, the sampling is efficient since $S_1 \cup \ldots \cup S_n$ is small. This gives the following for pure-DP:

Lemma 11 Suppose there is a poly log|C|-time algorithm $\mathcal{O}$ that samples a random element of C where each element of C is output with probability at least 0.1/|C|. Then, there is a (n, $\ell$, log|C|)-time ε-DP algorithm that, with probability 0.99, solves $\ell$-SparseSelection with additive error $$O\left(\frac{1}{\varepsilon} \cdot \log |C|\right).$$

We remark that, in Lemma 11, we only require $\mathcal{O}$ to sample approximately uniformly from C. This is due to a technical reason that we only have such a sampler for the lattice covers we use. Nonetheless, the outline of the algorithm is still exactly the same as before.

For approximate-DP, it turns out that we can get rid of the dependency of |C| in the additive error entirely, by adjusting the probability assigned to each of the two cases. In fact, for the second case, it even suffices to just output some symbol $\bot$ instead of sampling (approximately) uniformly from C. Hence, there is no need for a sampler for C at all, and this gives us the following guarantees:

Lemma 12 There is a poly (n, $\ell$, log|C|)-time ($\varepsilon$, $\delta$)-DP algorithm that, with probability 0.99, solves $\ell$-SparseSelection with additive error $$O\left(\frac{1}{\varepsilon} \log\left(\frac{n\ell}{\varepsilon\delta}\right)\right).$$

Putting Things Together

With the ingredients ready, the DensestBall algorithm is given in Algorithm 1 below. The pure- and approximate-DP algorithms for SparseSelection in Lemmas 11 and 12 lead to Theorem 7.

---

Algorithm 1

--- procedure DensestBall ($x_1, \ldots, x_n$; r, a)
  $C_{ar}$ ← (ar)-cover from Lemma 9
  for i ∈ [n] do
    $S_i$ ← decoded list of x at distance (1 + a)r with respect to $C_{ar}$
  return SparseSelection($S_1, \ldots, S_n$)

---

Example Private K-Means and K-Median

We next describe how we use our DensestBall algorithm along with additional ingredients adapted from previous studies of coresets to obtain DP approximation algorithms for k-means and k-media with nearly tight approximation ratios and small additive errors as stated next:

Theorem 13. Assume there is a polynomial-time (not necessarily DP) algorithm for k-means (resp., k-median) in $\mathbb{R}^d$ with approximation ratio w. Then, there is an $\varepsilon$-DP algorithm that runs in time $k^{O_a(1)}$poly(nd) and, with probability 0.99, produces a $$\left(w(1+\alpha), O_{w,a}\left(\left(\frac{kd + k^{O_\alpha(1)}}{\varepsilon}\right) poly \log n\right)\right)$$

-approximation for k-means (resp., k-median). Moreover, there is an ($\varepsilon$, $\delta$)-DP algorithm with the same runtime and approximation ratio but with additive error $$O_{w,a}\left(\left(\frac{k\sqrt{d}}{\varepsilon} \cdot poly \log\left(\frac{k}{\delta}\right)\right) + \left(\frac{k^{O_\alpha(1)}}{\varepsilon} \cdot poly \log n\right)\right).$$

To prove Theorem 13, as for DensestBall, we first reduce the dimension of the clustering instance from d to d'=$O_\alpha$(log k), which can be done using the recent result of Makarychev et al. (Konstantin Makarychev, Yury Makarychev, and Ilya P. Razenshteyn. Performance of Johnson-Lindenstrauss transform for k-means and k-medians clustering. In STOC, pages 1027-1038, 2019). Our task thus boils down to proving the following low-dimensional analogue of Theorem 13.

Theorem 14. Under the same assumption as in Theorem 13, there is an $\varepsilon$-DP algorithm that runs in time $2^{O_\alpha(d')}$poly(n) and, with probability 0.99, produces a $$\left(w(1+\alpha), O_{\alpha,w}\left(\frac{k^2 \cdot 2^{O_\alpha(d')}}{\varepsilon} poly \log n\right)\right).$$

-approximation for k-means (resp., k-median).

We point out that the reduced dimension d' is $O_\alpha(\log k)$ as opposed to $O_\alpha(\log n)$ (which is the bound from a generic application of the JL lemma), as otherwise the additive error in Theorem 14 would be poly(n), which is vacuous, instead of poly(k). We next proceed by (i) finding a "coarse" centroid set (satisfying Definition 4 with w=O(1)), (ii) turning the centroid set into a DP coreset (satisfying Definition 5 with w=1+$\alpha$), and (iii) running the non-private approximation algorithm as a black box. We describe these steps in more detail below.

Finding a Coarse Centroid Set via DensestBall

We consider geometrically increasing radii (e.g., r=1/n, 2/n, 4/n, . . . ). For each such r, we iteratively run our DensestBall algorithm some number (e.g., 2k) of times, and for each returned center, remove all points within some threshold distance (e.g., 8r) from it. This yields a number of candidate centers, e.g., 2k log n candidate centers. We prove that they form a centroid set with a constant approximation ratio and a small additive error:

Lemma 15. There is a polynomial time $\varepsilon$-DP algorithm that, with probability 0.99, outputs an $$\left(O(1), O\left(\frac{k^2 d'}{\varepsilon} poly \log n\right)\right)$$

-centroid set of size 2k log n for k-,means (resp., k-median).

We point out that the solution to this step is not unique. For example, it is possible to run the DP algorithm for k-means from (Uri Stemmer and Haim Kaplan. Differentially private k-means with constant multiplicative error. In NeurIPS, pages 5436-5446, 2018) instead of Lemma 15. However, we choose to use our algorithm since its analysis works almost verbatim for both k-means and k-means, and it is simple.

Turning a Coarse Centroid Set Into a Coreset

Once we have a coarse centroid set from the previous step, we follow the approach of Feldman et al. (Dan Feldman, Amos Fiat, Haim Kaplan, and Kobbi Nissim. Private coresets. In STOC, pages 361-370, 2009.), which can turn the coarse centroid and eventually produce a DP coreset:

Lemma 16. There is an $2^{O_\alpha(d')}$poly(n)-time $\varepsilon$-DP algorithm that, with probability 0.99, produces an $$\left(\alpha, O_\alpha \frac{k^2 \cdot 2^{O_\alpha(d')}}{\varepsilon} poly \log n\right)$$

-coreset for k-means (and k-median).

Roughly speaking, the idea is to first "refine" the coarse centroid by constructing an exponential cover around each center c from Lemma 15. Specifically, for each radius r=1/n, 2/n, 4/n, . . . , we consider all points in the (αr)-cover of the ball of radius r around c. Notice that the number of points in such a cover can be bounded by $2^{O_\alpha(d')}$. Taking the union over all such c, r, this result in a new fine centroid set of size $2^{O_\alpha(d')} \cdot \text{poly}(k, \log n)$. Each input point is then snapped to the closet point in this set; these snapped points form a good coreset. To make this coreset private, we add an appropriately calibrated noise to the number of input points snapped to each point in the fine centroid set. The additive error resulting from this step scales linearly with the size of the fine centroid set, which is $2^{O_\alpha(d')} \cdot \text{poly}(k, \log n)$ as desired.

Finishing Steps

Finally, we can simply run the (not necessarily DP) approximation algorithm on the DP coreset from Lemma 16, which immediately yields Theorem 14.

Example Applications

Our algorithms imply new results for other well-studied tasks, which we now describe.

1-Cluster

Recall the 1-Cluster problem described above. A discretization of the inputs is necessary to guarantee a finite error with DP, so we assume that they lie in $\mathbb{B}_k^d$. For this problem, previous work has obtained an $O(\sqrt{\log n})$ approximation ratio, which was subsequently improved to some large constant by in further work, albeit with an additive error that grows polynomially in n. Using our DensestBall algorithms we get a 1+α approximation ratio with additive error polylogarithmic in n:

Theorem 17. For 0<k<1, there is an ε-DP algorithm that runs in (nd)$^{O_\alpha(1)}$poly log(1/k) time and with probability 0.99, outputs a $$\left(1+\alpha, O_\alpha\left(\frac{d}{\varepsilon} \text{poly} \log\left(\frac{n}{\varepsilon\kappa}\right)\right)\right)$$

-approximation for 1-Cluster. For any δ>0, there is an (ε, δ)-DP algorithm with the same runtime and approximation ratio but with additive error $$O_\alpha\left(\frac{\sqrt{d}}{\varepsilon} \cdot \text{poly} \log\left(\frac{nd}{\varepsilon\delta}\right)\right) + O\left(\frac{1}{\varepsilon} \cdot \log\left(\frac{1}{\delta}\right) \cdot 9^{\log^*(d/\kappa)}\right).$$

Sample and Aggregate

Consider functions $f: U^* \to \mathbb{B}_k^d$ mapping databases to the discretized unit ball. A basic technique in DP is Sample and Aggregate, whose premise is that for large databases $S \in U^*$, evaluating $f$ on a random subsample of S can give a good approximation to $f(S)$. This method enables bypassing worst-case sensitivity bounds in DP and it captures basic machine learning primitives such as bagging.

Concretely, a point $c \in \mathbb{B}_k^d$ is an (m, r, ζ)-stable point of $f$ on S if $\Pr[\|f(S')-c\|_2 \leq r] \geq \zeta$ for S' a database of m i.i.d. samples from S. If such a point c exists, $f$ is (m, r, ζ)-stable on S, and r is a radius of c. Via a reduction to 1-Cluster, some prior work has found a stable point of radius within an $O(\sqrt{\log n})$ factor from the smallest possible while other prior work got an $O(\sqrt{d})$ approximation, and a constant factor is subsequently implied by additional prior work. Our 1-Cluster algorithm yields a 1+α approximation:

Theorem 18. Let d, m, n∈ ℕ and 0<ε, ζ, α, δ, κ<1 with $$m \leq n, \varepsilon \leq \frac{\zeta}{72} \text{ and } \delta \leq \frac{\varepsilon}{300}.$$

There is an (ε, δ)-DP algorithm that takes $f: U^n \to \mathbb{B}_k^d$ and parameters m, ζ, ε, δ, runs in time $$\left(\frac{nd}{m}\right)^{O_\alpha(1)}$$

poly log(1/k) plus the time for O(n/m) evaluations of $f$ on a dataset of size m, and whenever $f$ is (m, r, ζ)-stable on S, with probability 0.99, the algorithm outputs an $$\left(m, (1+\alpha)r, \frac{\zeta}{8}\right)$$

-stable point of $f$ on S, provided that $$n \geq m \cdot O_\alpha\left(\frac{\sqrt{d}}{\varepsilon} \cdot \text{poly} \log\left(\frac{nd}{\delta}\right) + \frac{1}{\varepsilon} \cdot \log\left(\frac{1}{\delta}\right) \cdot 9^{\log^*(d/\kappa)}\right).$$

Agnostic Learning of Halfspaces With a Margin

We next apply our algorithms to the well-studied problem of agnostic learning of halfspaces with a margin. Denote the error rate of a hypothesis h on a distribution D on labeled samples by err$^D$(h), and the μ-margin error rate of halfspace $h_u(x)=\text{sgn}(u \cdot x)$ on D by err$_\mu^D$(u). Furthermore, let OPT$_\mu^D := \min_{u \in \mathbb{R}^d}$ err$_\mu^D$(u). The problem of learning halfspaces with a margin in the agnostic PAC model can be defined as follows.

Definition 19. Let d∈ ℕ and μ, t∈ ℝ$^+$. An algorithm properly agnostically PAC learns halfspaces with margin μ, error t and sample complexity m, if given as input a training set S={$(x^{(i)}, y^{(i)})\}_{i=1}^m$ of i.i.d. samples drawn from an unknown distribution D on $\mathcal{B}(0,1) \times \{\pm 1\}$, it outputs a halfspace $h_u: \mathbb{R}^d \to \{\pm 1\}$ satisfying err$^D(h_u) \leq$ OPT$_\mu^D$+t with probability 0.99.

Via a reduction of [Shai Ben-David and Hans Ulrich Simon. Efficient learning of linear perceptrons. In *NIPS*, pages 189-195, 2000, Shai Ben-David, Nadav Eiron, and Hans Ulrich Simon. The computational complexity of densest region detection. *JCSS*, 64(1):22-47, 2002] from agnostic learning of halfspaces with a margin to DensestBall, we can use our DensestBall algorithm to derive the following:

Theorem 20. For 0<μ, t<1, there is an ε-DP algorithm that runs in time $$\left(\frac{1}{\varepsilon t}\right)^{O_\mu(1)} + \text{poly}\left(O_\mu\left(\frac{d}{\varepsilon t}\right)\right),$$

and with probability 0.99, properly agnostically learns halfspaces with margin μ, error t, and sample complexity $$O_\mu\left(\frac{1}{t^2} \cdot \text{poly} \log\left(\frac{1}{t}\right)\right).$$

We prove Theorem 20 here as it is a simple blackbox application of the DensestBall algorithm.

ClosestPair

Finally, we depart from the notion of DP and instead give an application of efficiently list-decodable covers to the ClosestPair problem:

Definition 21. (ClosestPair) Given points $x_1, \ldots, x_n \in \mathbb{Z}^d$, where each coordinate of $x_i$ is represented as an L-bit integer, and an integer $\xi \in \mathbb{Z}$, determine whether there exists $1 \leq i < j \leq n$ such that $\|x_i - x_j\|_2^2 \leq \xi$.

In the dynamic setting of ClosestPair, we start with an empty set S of points. At each step, a point maybe added to and removed from S, and we have to answer whether there are two distinct points in S whose squared Euclidean distance is at most $\xi$. Throughout, we assume without loss of generality that x must belong to S before "remove x" can be invoked. To make the algorithm work when this assumption does not hold, we simply keep a history-independent data structure that can quickly answer whether x belongs to S.

One primary contribution provided by the present disclosure in this context is a faster history-independent data structure for dynamic ClosestPair. Recall that a deterministic data structure is said to be history-independent if, for any two sequences of updates that result in the same set of points, the states of the data structure must be the same in both cases. For a randomized data structure, we say that it is history-independent if, for any two sequences of updates that result in the same set of points, the distribution of the state of the data structure must be the same.

Theorem 22. There is a history-independent randomized data structure for dynamic ClosestPair that supports up to n updates, with each update takes $2^{O(d)}$poly(log n, L) time, and uses O(nd·poly(log n, L)) memory.

We remark that the data structure is only randomized in terms of the layout of the memory (i.e., state), and that the correctness always holds. Our data structure improves that of prior work, in which the running time per update operation is $d^{O(d)}$(log n, L).

Aaronson et al. (Scott Aaronson, Nai-Hui Chia, Han-Hsuan Lin, Chunhao Wang, and Ruizhe Zhang. On the Quantum Complexity of Closest Pair and Related Problems. In *CCC*, pages 16:1-16:43, 2020) show how to use their data structure together with quantum random walks from (Frederic Magniez, Ashwin Nayak, Jeremie Roland, and Miklos Santha. Search via quantum walk. *SIAM J. Comput.*, 40(1): 142-164, 2011.) to provide a fast quantum algorithm for ClosestPair in low dimensions which runs in time $d^{O(d)}n^{2/3}$poly(log n, L). With our improvement above, we immediately obtain a speed up in terms of the dependency on d under the same model (The model assumes the presence of gates for random access to an m-qubit quantum memory that takes time only poly(log m). Such an assumption is necessary even for element distinctness, which is an easier problem than ClosestPair):

Corollary 23. There exists a quantum algorithm that solves (offline) ClosestPair with probability 0.99 in time $2^{O(d)}n^{2/3}$poly(log n, L).

Proof Overview

We will now briefly give an outline of the proof of Theorem 22. Our proof in fact closely follows that of Aaronson et al. (Scott Aaronson, Nai-Hui Chia, Han-Hsuan Lin, Chunhao Wang, and Ruizhe Zhang. On the Quantum Complexity of Closest Pair and Related Problems. In *CCC*, pages 16:1-16:43, 2020). As such, we will start with the common outline before pointing out the differences. At a high-level, both algorithms partition the space $\mathbb{R}^d$ into small cells $C_1, C_2, \ldots$, each cell having a diameter at most $\sqrt{\xi}$. Two cells C, C' are said to be adjacent if there are $x \in C$, $x' \in C'$ for which $\|x-x'\|_2^2 \xi$. The main observations here are that (i) if there are two points from the same cell, then clearly the answer to ClosestPair is YES and (ii) if no two points are from the same cell, it suffices to check points from adjacent cells. Thus, the algorithm maintains a map from each present cell to the set of points in the cell, and the counter $p_{\leq \xi}$ of the number of points from different cells that are within $\sqrt{\xi}$ in Euclidean distance. A data structure to maintain such a map is known. As for $p_{\leq \xi}$, adding/removing a point only requires one to check the cell to which the point belongs, together with the adjacent cells. Thus, the update will be fast, as long as the number of adjacent cells (to each cell) is small.

The first and most important difference between the two algorithms is the choice of the cells. Aaronson lets each cell be a d-dimensional box of length $\sqrt{\xi/d}$, which results in the number of adjacent cells being $d^{O(d)}$. On the other hand, we use a $(0.5\sqrt{\xi})$-cover and let the cells be the Voronoi cells of the cover. It follows from the list size bound at distance $(1.5\sqrt{\xi})$ that the number of adjacent cells is at most $2^{O(d)}$. This indeed corresponds to the speedup seen in our data structure.

A second modification is that, instead of keeping all points in each cell, we just keep their (bit-wise) XOR. The reason behind this is the observation (i) above, which implies that, when there are more than one point in a cell, it does not matter anymore what exactly these points are. This helps simplify our proof; in particular, Aaronson needs a different data structure to handle the case where there is more than one solution; however, our data structure works naturally for this case.

Example Devices and Systems

FIG. 1A depicts a block diagram of an example computing system 100 according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models).

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120.

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service. Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models).

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

In some implementations, the user computing device 102 can include a clusterer 123. Additionally or alternatively, the server computing system 130 can include a clusterer 143. Additionally or alternatively, the training computing system 150 can include a clusterer 163. Each of the clusterer 123, the clusterer 143, and the clusterer 163 can be configured to perform any of the clustering techniques described herein.

Each of the clusterer 123, the clusterer 143, and the clusterer 163 can include computer logic utilized to provide desired functionality. Each of the clusterer 123, the clusterer 143, and the clusterer 163 can be implemented in hardware, firmware, and/or software controlling a general purpose processor. For example, in some implementations, each of the clusterer 123, the clusterer 143, and the clusterer 163 can include program files stored on a storage device, loaded into a memory and executed by one or more processors. In other implementations, each of the clusterer 123, the clusterer 143, and the clusterer 163 can include one or more sets of computer-executable instructions that are stored in a tangible computer-readable storage medium such as RAM hard disk or optical or magnetic media.

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. Statistical data can be, represent, or otherwise include data computed and/or calculated from some other data source. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). For example, the task may be audio compression task. The input may include audio data and the output may comprise compressed audio data. In another example, the input includes visual data (e.g. one or more image or videos), the output comprises compressed visual data, and the task is a visual data compression task. In another example, the task may comprise generating an embedding for input data (e.g. input audio or visual data).

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
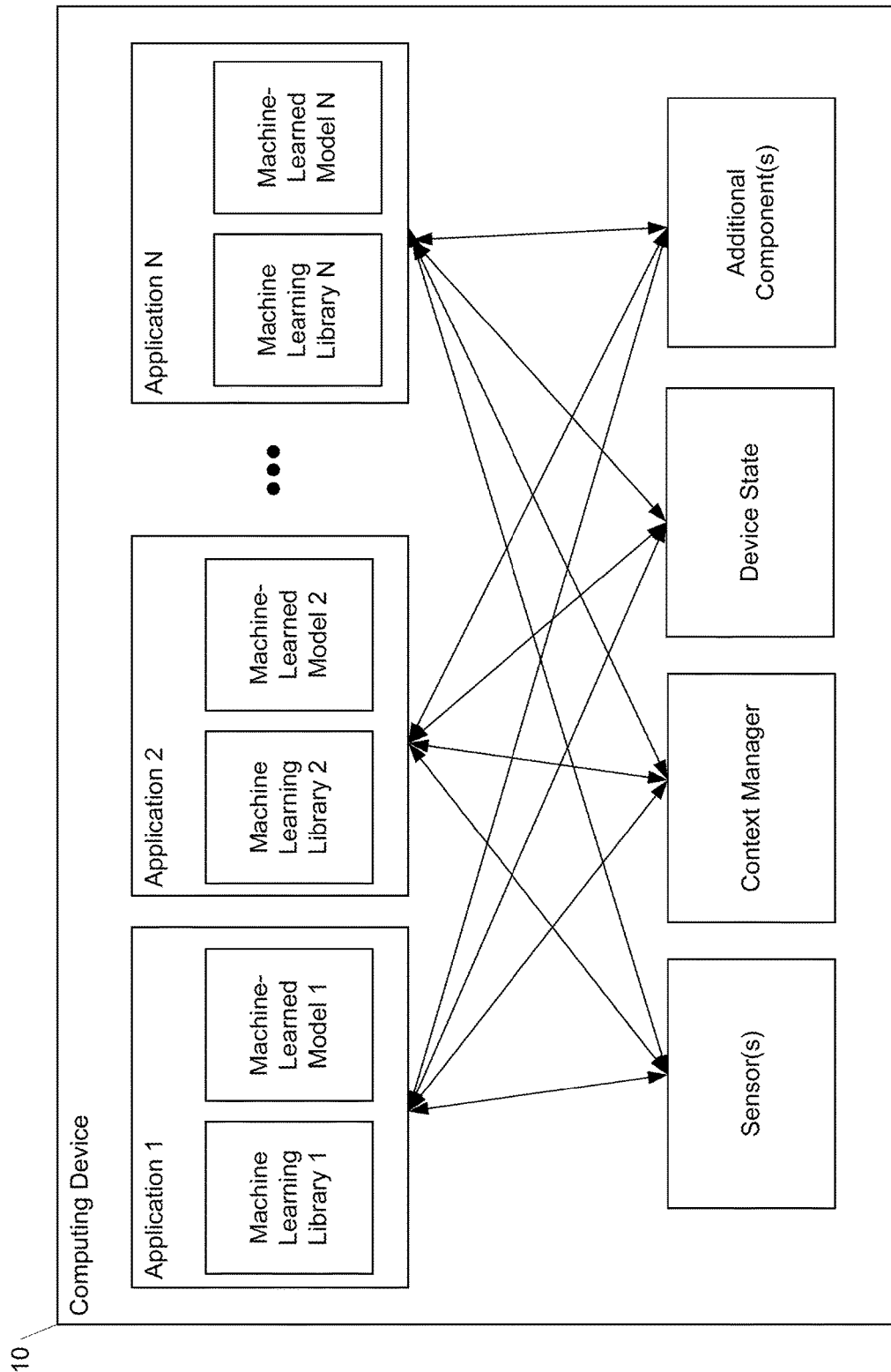
FIG. 1B depicts a block diagram of an example computing device according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
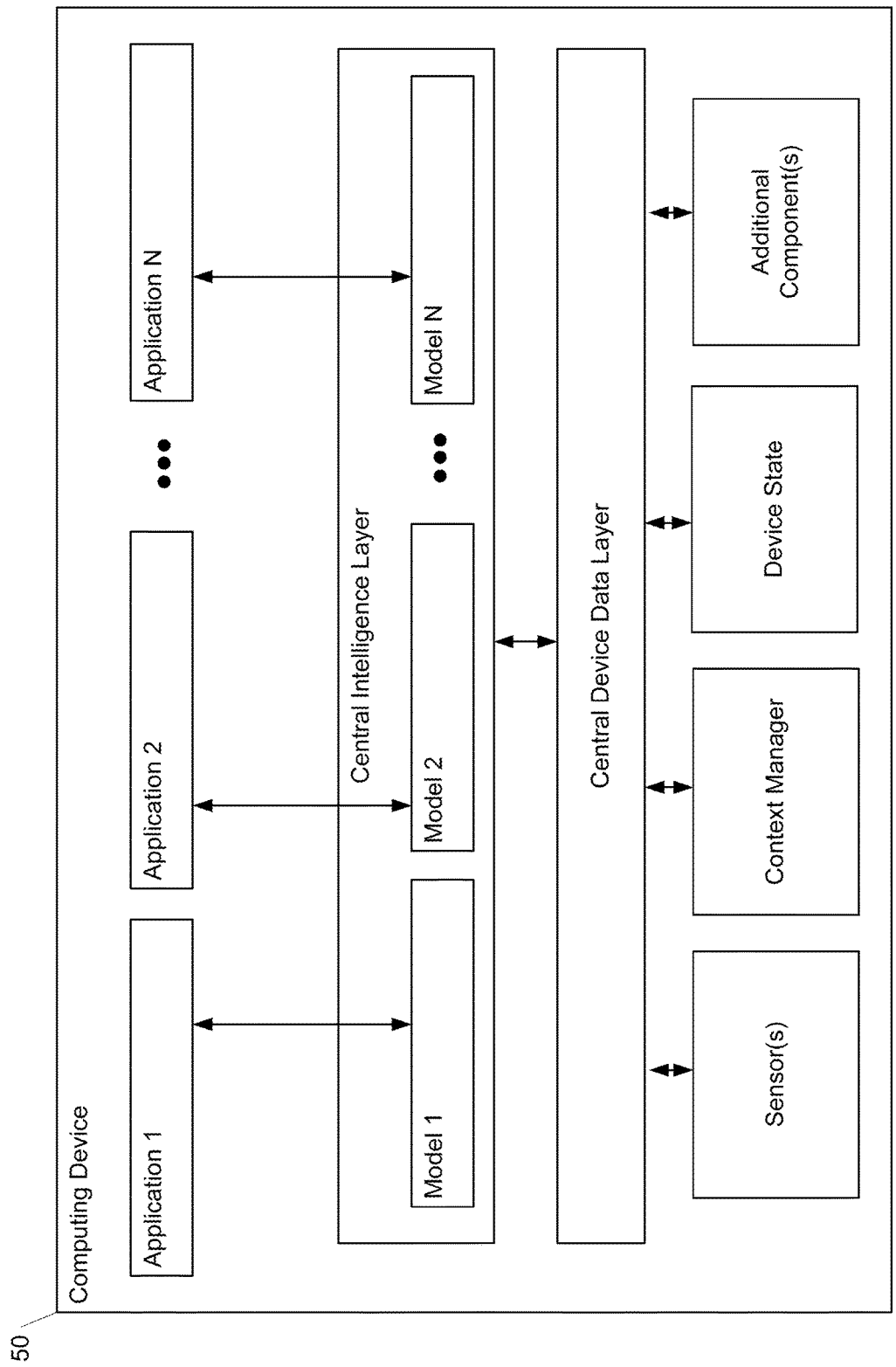
FIG. 1C depicts a block diagram of an example computing device according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Methods

Figure 2:
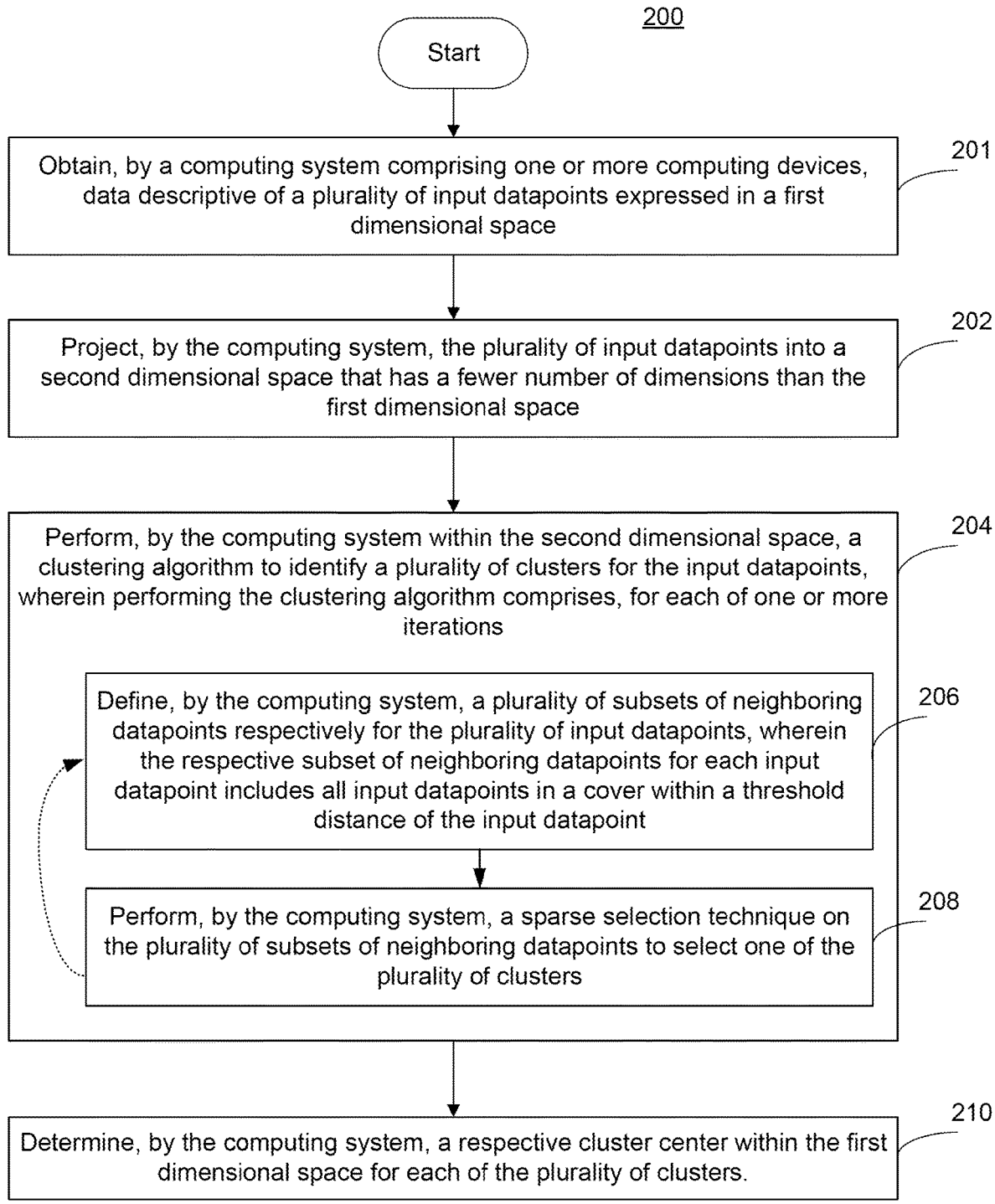
FIG. 2 depicts a flow chart diagram of an example method to perform clustering according to example embodiments of the present disclosure.
Figure 3:
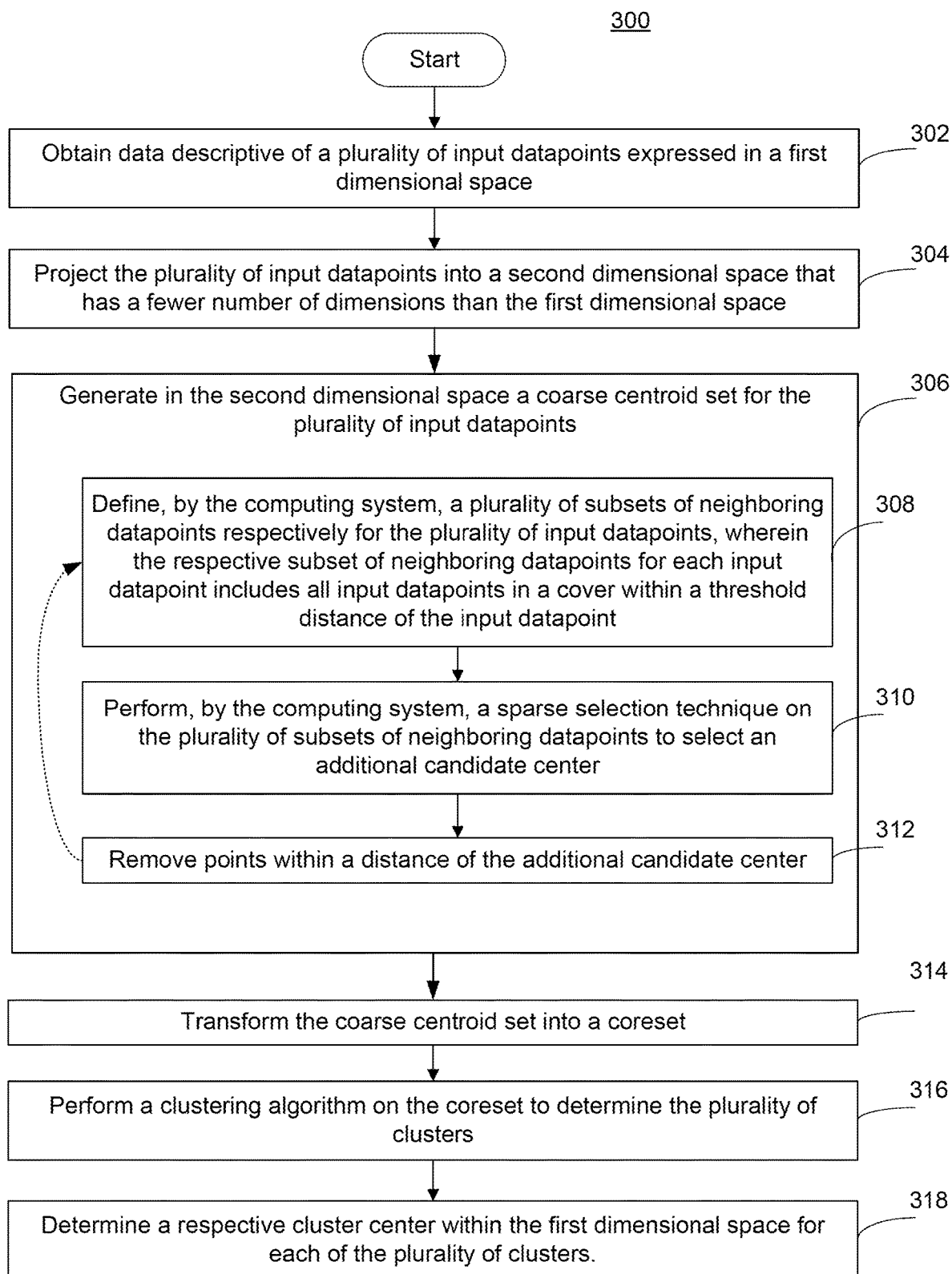
FIG. 3 depicts a flow chart diagram of an example method to perform clustering according to example embodiments of the present disclosure.

FIGS. 2 and 3 depict flow chart diagrams of example methods to perform clustering according to example embodiments of the present disclosure. Although FIGS. 2 and 3 depict steps performed in a particular order for purposes of illustration and discussion, the methods of the present disclosure are not limited to the particularly illustrated order or arrangement.

FIG. 2 depicts a computer-implemented method 200 for performing clustering with improved privacy and computational efficiency.

At 201, the computer-implemented method includes obtaining, by a computing system may include one or more computing devices, data descriptive of a plurality of input datapoints expressed in a first dimensional space.

At 202, the method also includes projecting, by the computing system, the plurality of input datapoints into a second dimensional space that has a fewer number of dimensions than the first dimensional space.

At 204, the method also includes performing, by the computing system within the second dimensional space, a clustering algorithm to identify a plurality of clusters for the input datapoints.

As illustrated in FIG. 2, in some implementations, performing the clustering algorithm may include the following operations, for each of one or more iterations.

At 206, the method can include defining, by the computing system, a plurality of subsets of neighboring datapoints respectively for the plurality of input datapoints, where the respective subset of neighboring datapoints for each input datapoint includes all input datapoints in a cover within a threshold distance of the input datapoint.

At 208, the method can include performing, by the computing system, a sparse selection technique on the plurality of subsets of neighboring datapoints to select one of the plurality of clusters.

In some implementations, at 208, performing, by the computing system, the sparse selection technique on the plurality of subsets of neighboring datapoints may include probabilistically selecting between: sampling, by the computing system, from a union of all of the plurality of subsets of neighboring datapoints; or sampling, by the computing system, from the cover. Sampling, by the computing system, from the cover may include sampling, by the computing system, approximately uniformly from the cover. The clustering algorithm may be pure differentially private.

In some implementations, at 208, performing, by the computing system, the sparse selection technique on the plurality of subsets of neighboring datapoints may include probabilistically selecting between: sampling, by the computing system, from a union of all of the plurality of subsets of neighboring datapoints; or sampling, by the computing system, an additional candidate with a fixed score. The clustering algorithm may be approximately differentially private.

In some implementations, the cover may include a lattice-based cover. In some implementations, the threshold distance may include a radius value times one plus an alpha value.

Referring still to FIG. 2, at 210, the method also includes determining, by the computing system, a respective cluster center within the first dimensional space for each of the plurality of clusters. Other embodiments of this aspect include corresponding computer systems, apparatus, and computer programs recorded on one or more computer storage devices, each configured to perform the actions of the methods.

In some implementations, at 210, determining, by the computing system, the respective cluster center within the first dimensional space for each of the plurality of clusters may include: performing, by the computing system, a DensestBall algorithm on each respective cluster to find each respective cluster center within the first dimensional space.

In some implementations, at 210, determining, by the computing system, the respective cluster center within the first dimensional space for each of the plurality of clusters may include: randomly rotating, by the computing system, the plurality of input datapoints; and for each of a plurality of blocks of the second dimensional space, performing, by the computing system, a DensestBall algorithm.

FIG. 3 depicts a computer-implemented method 300 for performing clustering with improved privacy and computational efficiency.

At 302, the method includes obtaining data descriptive of a plurality of input datapoints expressed in a first dimensional space.

At 304, the method includes projecting the plurality of input datapoints into a second dimensional space that has a fewer number of dimensions than the first dimensional space.

At 306, the method includes generating in the second dimensional space a coarse centroid set for the plurality of input datapoints.

As illustrated in FIG. 3, in some implementations, generating at 306 the coarse centroid set may include the following operations, for each of a plurality of iterations:

At 308, the method can include defining, by the computing system, a plurality of subsets of neighboring datapoints respectively for the plurality of input datapoints, where the respective subset of neighboring datapoints for each input datapoint includes all input datapoints in a cover within a threshold distance of the input datapoint.

At 310, the method can include performing, by the computing system, a sparse selection technique on the plurality of subsets of neighboring datapoints to select an additional candidate center.

In some implementations, at 310, performing, by the computing system, the sparse selection technique on the plurality of subsets of neighboring datapoints may include probabilistically selecting between: sampling, by the computing system, from a union of all of the plurality of subsets of neighboring datapoints; or sampling, by the computing system, from the cover. Sampling, by the computing system, from the cover may include sampling, by the computing system, approximately uniformly from the cover.

In some implementations, at 310, performing, by the computing system, the sparse selection technique on the plurality of subsets of neighboring datapoints may include probabilistically selecting between: sampling, by the computing system, from a union of all of the plurality of subsets of neighboring datapoints; or sampling, by the computing system, an additional candidate with a fixed score.

In some implementations, the cover may include a lattice-based cover. In some implementations, the threshold distance may include a radius value times one plus an alpha value.

At 312, the method can include removing points within a distance of the additional candidate center.

Referring still to FIG. 3, at 314, the method includes transforming the coarse centroid set into a coreset. In some implementations, transforming at 314 the coarse centroid set into the coreset may include: constructing an exponential cover around each candidate center to generate a fine centroid set; and snapping each input datapoint to a closest point in the fine centroid set.

At 316, the method includes performing a clustering algorithm on the coreset to determine the plurality of clusters. The clustering algorithm may include a 1-cluster algorithm. The clustering algorithm may include a k-means algorithm. The clustering algorithm may include a k-median algorithm.

At 318, the method includes determining a respective cluster center within the first dimensional space for each of the plurality of clusters.

In some implementations, at 318, determining, by the computing system, the respective cluster center within the first dimensional space for each of the plurality of clusters may include: performing, by the computing system, a DensestBall algorithm on each respective cluster to find each respective cluster center within the first dimensional space.

In some implementations, at 318, determining, by the computing system, the respective cluster center within the first dimensional space for each of the plurality of clusters may include: randomly rotating, by the computing system, the plurality of input datapoints; and for each of a plurality of blocks of the second dimensional space, performing, by the computing system, a DensestBall algorithm.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for performing ($\varepsilon$, $\delta$) differentially private clustering with improved privacy and computational efficiency, the method comprising:
    obtaining, by a computing system comprising one or more computing devices, data descriptive of a plurality of input datapoints expressed in a first dimensional space;
    projecting, by the computing system, the plurality of input datapoints into a second dimensional space that has a fewer number of dimensions than the first dimensional space;
    performing, by the computing system within the second dimensional space, an ($\varepsilon$, $\delta$) differentially private clustering algorithm to identify a plurality of clusters for the input datapoints, wherein performing the ($\varepsilon$, $\delta$) differentially private clustering algorithm comprises, for each of one or more iterations:
        defining, by the computing system, a plurality of subsets of neighboring datapoints respectively for the plurality of input datapoints, wherein the respective subset of neighboring datapoints for each input datapoint includes all input datapoints in a cover within a threshold distance of the input datapoint, wherein the threshold distance comprises a radius value times one plus an alpha value associated with a number of dimensions of the second dimensional space; and
        performing, by the computing system based at least in part on a differential privacy parameter $\varepsilon$, a sparse selection technique on the plurality of subsets of neighboring datapoints to select one of the plurality of clusters;
    determining, by the computing system, a respective cluster center within the first dimensional space for each of the plurality of clusters; and
    training a machine-learned model based at least in part on the plurality of clusters.

2. The computer-implemented method of claim 1, wherein performing, by the computing system, the sparse selection technique on the plurality of subsets of neighboring datapoints comprises probabilistically selecting a sampling action of a set of sampling actions and performing the sampling action, wherein a respective probability of selecting each action of the set of sampling actions is greater than zero, the set of sampling actions comprising:
    sampling, by the computing system, from a union of all of the plurality of subsets of neighboring datapoints; and
    sampling, by the computing system, from the cover.

3. The computer-implemented method of claim 2, wherein sampling, by the computing system, from the cover comprises sampling, by the computing system, from the cover such that each element of the cover is output with a probability of at least 0.1 divided by a size of the cover.

4. The computer-implemented method of claim 1, wherein the clustering algorithm comprises at least one of a DensestBall clustering algorithm, a 1-Cluster algorithm, a k-means algorithm, and a k-median algorithm.

5. The computer-implemented method of claim 1, wherein the cover comprises a list-decodable cover.

6. The computer-implemented method of claim 1, wherein the cover comprises a lattice-based cover.

7. The computer-implemented method of claim 1, wherein determining, by the computing system, the respective cluster center within the first dimensional space for each of the plurality of clusters comprises:
    performing, by the computing system, a DensestBall algorithm on each respective cluster to find each respective cluster center within the first dimensional space.

8. The computer-implemented method of claim 1, wherein determining, by the computing system, the respective cluster center within the first dimensional space for each of the plurality of clusters comprises:
    randomly rotating, by the computing system, the plurality of input datapoints; and
    performing, by the computing system, one or more DensestBall algorithms.

9. A computing system for performing ($\varepsilon$, $\delta$) differentially private clustering with improved privacy, the computing system comprising:
    one or more processors; and
    one or more non-transitory computer-readable media that store instructions that, when executed by the one or more processors, cause the computing system to perform operations, the operations comprising:
        obtaining data descriptive of a plurality of input datapoints expressed in a first dimensional space;
        projecting the plurality of input datapoints into a second dimensional space that has a fewer number of dimensions than the first dimensional space;
        generating in the second dimensional space a coarse centroid set for the plurality of input datapoints, wherein generating the coarse centroid set comprises, for each of a plurality of iterations:
- defining, by the computing system, a plurality of subsets of neighboring datapoints respectively for the plurality of input datapoints, wherein the respective subset of neighboring datapoints for each input datapoint includes all input datapoints in a cover within a threshold distance of the input datapoint;
- performing, by the computing system based at least in part on a differential privacy parameter $\varepsilon$, a sparse selection technique on the plurality of subsets of neighboring datapoints to select an additional candidate center; and
- removing points within a distance of the additional candidate center;

transforming the coarse centroid set into a coreset;
performing a clustering algorithm on the coreset to determine a plurality of clusters;
determining a respective cluster center within the first dimensional space for each of the plurality of clusters; and
training a machine-learned model based at least in part on the plurality of clusters;
wherein transforming the coarse centroid set into the coreset comprises:
- constructing an exponential cover around each candidate center to generate a fine centroid set; and
- snapping each input datapoint to a closest point in the fine centroid set.

10. The computing system of claim 9, wherein the clustering algorithm comprises a 1-cluster algorithm.

11. The computing system of claim 9, wherein the clustering algorithm comprises a k-means algorithm.

12. The computing system of claim 9, wherein the clustering algorithm comprises a k-median algorithm.

13. One or more non-transitory computer-readable media that collectively store instructions, that when executed by a computing system, cause the computing system to perform operations, the operations comprising:
performing an ($\varepsilon$, $\delta$) differentially private clustering algorithm to identify a plurality of clusters for a plurality of input datapoints, wherein performing the ($\varepsilon$, $\delta$) differentially private clustering algorithm comprises, for each of one or more iterations:
- defining, by the computing system, a plurality of subsets of neighboring datapoints respectively for the plurality of input datapoints, wherein the respective subset of neighboring datapoints for each input datapoint includes all input datapoints in a cover within a threshold distance of the input datapoint;
- performing, by the computing system based at least in part on a differential privacy parameter $\varepsilon$, a sparse selection technique on the plurality of subsets of neighboring datapoints to select one of the plurality of clusters; and training a machine-learned model based at least in part on the plurality of clusters;
wherein performing, by the computing system, the sparse selection technique on the plurality of subsets of neighboring datapoints comprises probabilistically selecting a sampling action of a set of sampling actions and performing the sampling action, wherein a respective probability of selecting each action of the set of sampling actions is greater than zero, the set of sampling actions comprising:
- sampling, by the computing system, from a union of all of the plurality of subsets of neighboring datapoints; and
- sampling, by the computing system, from the cover; and wherein sampling, by the computing system, from the cover comprises sampling, by the computing system, from the cover such that each element of the cover is output with a probability of at least 0.1 divided by a size of the cover.

14. The one or more non-transitory computer-readable media of claim 13, wherein the cover comprises a list-decodable cover.

15. The one or more non-transitory computer-readable media of claim 13, wherein the cover comprises a lattice-based cover.

* * * * *